(12) United States Patent
Cassidy

(10) Patent No.: US 7,420,727 B2
(45) Date of Patent: Sep. 2, 2008

(54) ACTIVE MATRIX ELECTROCHROMIC DISPLAY

(75) Inventor: Micheal Cassidy, Dublin (IE)

(73) Assignee: NTERA Limited, Dublin (IE)

( * ) Notice: Subject to any disclaimer, the term of this patent is extended or adjusted under 35 U.S.C. 154(b) by 30 days.

(21) Appl. No.: 11/536,316

(22) Filed: Sep. 28, 2006

(65) Prior Publication Data
US 2007/0171148 A1    Jul. 26, 2007

Related U.S. Application Data

(60) Provisional application No. 60/759,248, filed on Jan. 13, 2006.

(51) Int. Cl.
G02F 1/15      (2006.01)
G02F 1/153     (2006.01)
G09G 3/19      (2006.01)
G09G 3/38      (2006.01)

(52) U.S. Cl. .................. 359/265; 359/266; 359/267; 359/270; 359/273; 345/49; 345/105

(58) Field of Classification Search ......... 359/265–267, 359/269, 270, 272, 273, 275, 247, 248, 296; 345/43, 44, 49, 84, 85, 104, 105, 107, 204, 345/214; 428/76; 264/104
See application file for complete search history.

(56) References Cited

U.S. PATENT DOCUMENTS

| | | | |
|---|---|---|---|
| 4,184,751 A * | 1/1980 | Nicholson | 359/275 |
| 4,205,903 A | 6/1980 | Inami et al. | |
| 4,331,385 A * | 5/1982 | Kondo et al. | 359/269 |
| 4,977,007 A | 12/1990 | Kondo et al. | |
| 5,049,868 A | 9/1991 | Green et al. | |
| 5,714,247 A | 2/1998 | Kuo et al. | |
| 5,774,255 A * | 6/1998 | Howard | 359/267 |
| 6,067,184 A * | 5/2000 | Bonhote et al. | 359/265 |
| 6,144,429 A | 11/2000 | Nakai et al. | |
| 6,483,562 B1 | 11/2002 | Fukuyoshi et al. | |
| 6,836,305 B1 | 12/2004 | Kagawa et al. | |
| 7,177,064 B2 * | 2/2007 | Park | 359/270 |
| 7,352,500 B2 * | 4/2008 | Jagt et al. | 359/265 |
| 2002/0176039 A1 | 11/2002 | Kanesaka et al. | |
| 2006/0256250 A1* | 11/2006 | Kameyama et al. | 349/43 |
| 2007/0002424 A1* | 1/2007 | Hirota et al. | 359/265 |

(Continued)

FOREIGN PATENT DOCUMENTS

EP        0445720        5/1991

(Continued)

OTHER PUBLICATIONS

Bonhote et al., Nanocrystalline electrochromic displays—Jan. 20, 1999.

(Continued)

Primary Examiner—Loha Ben
(74) Attorney, Agent, or Firm—Volpe and Koenig, P.C.

(57) ABSTRACT

The present invention is an active matrix electrochromic display architecture where the active components are placed on the backplane of the display, thereby maximizing the viewable pixel area. The cathode of the electrochromic pixel is placed on top of the active components, with respect to the viewer, thereby allowing the active components to be as large as desired while not interfering with the viewable area of the pixel.

39 Claims, 7 Drawing Sheets

U.S. PATENT DOCUMENTS

2007/0182705 A1* 8/2007 Leyland et al. .............. 345/107
2007/0182706 A1* 8/2007 Cassidy et al. .............. 345/107

FOREIGN PATENT DOCUMENTS

| EP | 1271227 | 2/2003 |
|---|---|---|
| JP | 10010512 | 1/1998 |
| WO | WO03042753 | 5/2003 |
| WO | WO 2004/068231 | 8/2004 |

OTHER PUBLICATIONS

Corr et al., P-118: High Resolution electrochromic Displays for E-Readers—750—SID 05 Digest.

Edwards et al., P-92: Electrochromic Passive-Matrix Displays—570—SID 03 Digest.

Varsano et al., Ion Potential Diagrams as Guidelines for Stability and Performance of Electrochromic Devices.

* cited by examiner

ACTIVE MATRIX ELECTROCHROMIC DISPLAY

CROSS REFERENCE TO RELATED APPLICATION

This application claims the benefit of U.S. Provisional Application No. 60/759,248, filed on Jan. 13, 2006, which is incorporated by reference as if fully set forth herein.

FIELD OF INVENTION

The present invention generally relates to electrochromic displays. More particularly, the present invention relates to a reflective electrochromic display architecture for use with an active switching matrix for individually addressing a multitude of electrochromic pixels.

BACKGROUND

Electrochromic compounds exhibit a reversible color change when the compounds gain or lose electrons. Electrochromic devices that exploit the inherent properties of electrochromic compounds find application in large area static displays and automatically dimming mirrors, and are well known. Electrochromic display devices create images by selectively modulating light that passes through a controlled region containing an electrochromic compound. A multitude of controlled electrochromic regions may individually function as pixels to collectively create a high resolution image. Typically, these display devices contain a reflective layer underneath the electrochromic compound, respective to the viewer, for reflecting light allowed to pass beyond the electrochromic region. Simply put, the electrochromic pixel acts as a shutter either blocking light or allowing light to pass through to the underlying reflective layer.

A typical prior art electrochromic display device 10, as shown in FIG. 1, includes a base substrate 10, typically glass or plastic, which supports a transparent conductor layer 20, which may be, for example, a layer of fluorine doped tin oxide (FTO) or indium doped tin oxide (ITO). A nanoporous-nanocrystalline semi-conducting film 30, (herein referred to simply as a nano-structured film 30), is deposited, preferably by way of screen printing with an organic binder, on the transparent conductor 20. The nano-structured film is typically a doped metal oxide, such as antimony tin oxide (ATO). Optionally, a redox reaction promoter compound is adsorbed on the nano-structured film 30. An ion-permeable reflective layer 40, typically white titanium dioxide ($TiO_2$), is optionally deposited, preferably by way of screen printing with an organic binder followed by sintering, on the nano-structured film 30.

A second substrate 50, which is transparent, supports a transparent conductor layer 60, which may be a layer of FTO or ITO. A nano-structured film 70 having a redox chromophore 75, typically a 4,4'-bipyridinium derivative compound, adsorbed thereto is deposited on the transparent conductor 60, by way of a self-assembled mono-layer deposition from solution.

The base substrate 10 and the second substrate 50 are then assembled with an electrolyte 80 placed between the ion-permeable reflective layer 40 and the nano-structured film 70 having an adsorbed redox chromophore 75. A potential applied across the cathode electrode 90 and the anode electrode 100 reduces the adsorbed redox chromophore 75, thereby producing a color change. Reversing the polarity of the potential reverses the color change. When the redox chromophore 75 is generally black or very deep purple in a reduced state, a viewer 110 perceives a generally black or very deep purple color. When the redox chromophore 75 is in an oxidized state and generally clear, a viewer 110 will perceive light reflected off of the ion-permeable reflective layer 40, which is generally white. In this manner, a black and white display is realized by a viewer 110.

Electrochromic display devices such as the one described above are described in greater detail in U.S. Pat. No. 6,301,038 and U.S. Pat. No. 6,870,657, both to Fitzmaurice et al., which are herein incorporated by reference.

The electrochromic display 10 shown in FIG. 1 is a pixilated display, having individual image elements, (i.e. pixels A, B, and C). The potential applied to each pixel A, B, and C is provided by a dedicated routing track in the transparent conductive layer 60. Each pixel A, B, and C is therefore directly driven; a voltage applied to pixel A will not interfere with pixels B or C. In order to create a large electrochromic display capable of displaying high resolution images, a large number of pixels is required, and therefore a large number of direct drive routing tracks. For a typical computer monitor having millions of pixels, fabricating millions of direct drive routing tracks is impractical.

To reduce the complexity of providing each pixel with its own direct drive routing track, an active matrix may be used. In an active matrix, each pixel has an active component for electrically isolating each pixel from all other pixels and for matrix addressing of each pixel. FIG. 2A is a schematic illustration of an active matrix 200 for controlling a plurality of pixels addressed in rows $R_1 \ldots R_4$ and columns $C_1 \ldots C_7$. A multitude of active devices 210, typically transistors, are located at the intersection of each row and column. Referring to FIGS. 2A and 2B, each active device 210 includes a gate electrode 220, a source electrode 230 and a drain electrode 240. The cathode 250 of each pixel 260 is electrically connected to the drain electrode 240 of the active device 210. The anode 270 of the pixel 260 is commonly connected across all pixels.

To write data to a desired pixel 260, for example the pixel 260 at the intersection of row $R_2$ and column $C_2$, a row signal is applied to row $R_2$ to activate the active device 210, while a different row signal is applied to all other rows (i.e. rows $R_1$, $R_3$, and $R_4$) to ensure active devices 210 in these rows are kept inactive. A column signal is then applied on column $C_2$ to write data to the pixel 210. Typically, an entire row of pixels will be updated simultaneously by writing data to each pixel in a selected row at the same time. In this manner, a large number and high density of pixels may be individually controlled while maintaining electrical isolation of each pixel.

Typically, an active matrix is constructed from thin film transistors (TFTs). The fabrication of TFTs is well known in the art and includes the deposition of opaque metal layers on an insulative substrate. Therefore, TFTs are not transparent or translucent. Furthermore, in order to achieve optimal switching times and performance in an electrochromic display of the kind described above, the drain of each TFT must be on the cathode side of the display (i.e. on the side contained the nano-structured film with adsorbed viologen). Achieving active control of pixels A, B, and C in the electrochromic display 10 therefore requires placement of opaque TFTs on the front plane of the display, with respect to the viewer 110. This is disadvantageous as opaque TFTs diminish the reflectivity of the display, reduce pixel aperture, and adversely affect contrast ratio and apparent brightness of the display.

A further complication is that the relationship between transistor size and the switching speed of an electrochromic pixel is inversely proportional; the larger the transistor, the faster the switching time. Achieving video speed switching times, which are on the order of tens of milliseconds, therefore requires a large transistor relative to the area of the electrochromic pixel.

To illustrate, referring to FIG. 3, an electrochromic display 300 including a TFT active matrix 120 for individually addressing each pixel A, B, and C is shown. Each pixel A, B, and C is controlled by a transistor $120_A$, $120_B$, and $120_C$, respectively. Each opaque transistor $120_A$, $120_B$, and $120_C$ blocks a portion of the pixel it is controlling, (A, B, and C, respectively). Achieving fast switching times increases transistor size, thereby decreasing the visible pixel area and the reflectivity, contrast ratio, and brightness of the display 300.

Therefore, an active matrix electrochromic display without the disadvantages of the prior art is desired.

SUMMARY

The present invention is an active matrix electrochromic display architecture wherein the active components are placed on the backplane of the display, thereby maximizing the viewable pixel area. An insulating layer is positioned on the active components, and the cathode of an electrochromic pixel is placed on top of the insulating layer, with respect to the viewer, thereby allowing the active components to be as large as desired while not interfering with the viewable area of the pixel. The insulating layer may be reflective, or contain reflective particles. Alternatively, a reflective layer may be positioned between the insulating layer and a transparent conductor forming the electrochromic pixel.

BRIEF DESCRIPTION OF THE DRAWINGS

A more detailed understanding of the invention may be had from the following description, given by way of example and to be understood in conjunction with the accompanying drawings, wherein.

DETAILED DESCRIPTION OF THE PREFERRED EMBODIMENTS

The present invention is an electrochromic display architecture where the active components are placed on the backplane of the display, thereby maximizing the viewable pixel area. The cathode of the electrochromic pixel is placed on the active component thereby allowing the active component to be as large as desired while not interfering with the viewable area of the pixel.

Figure 1:
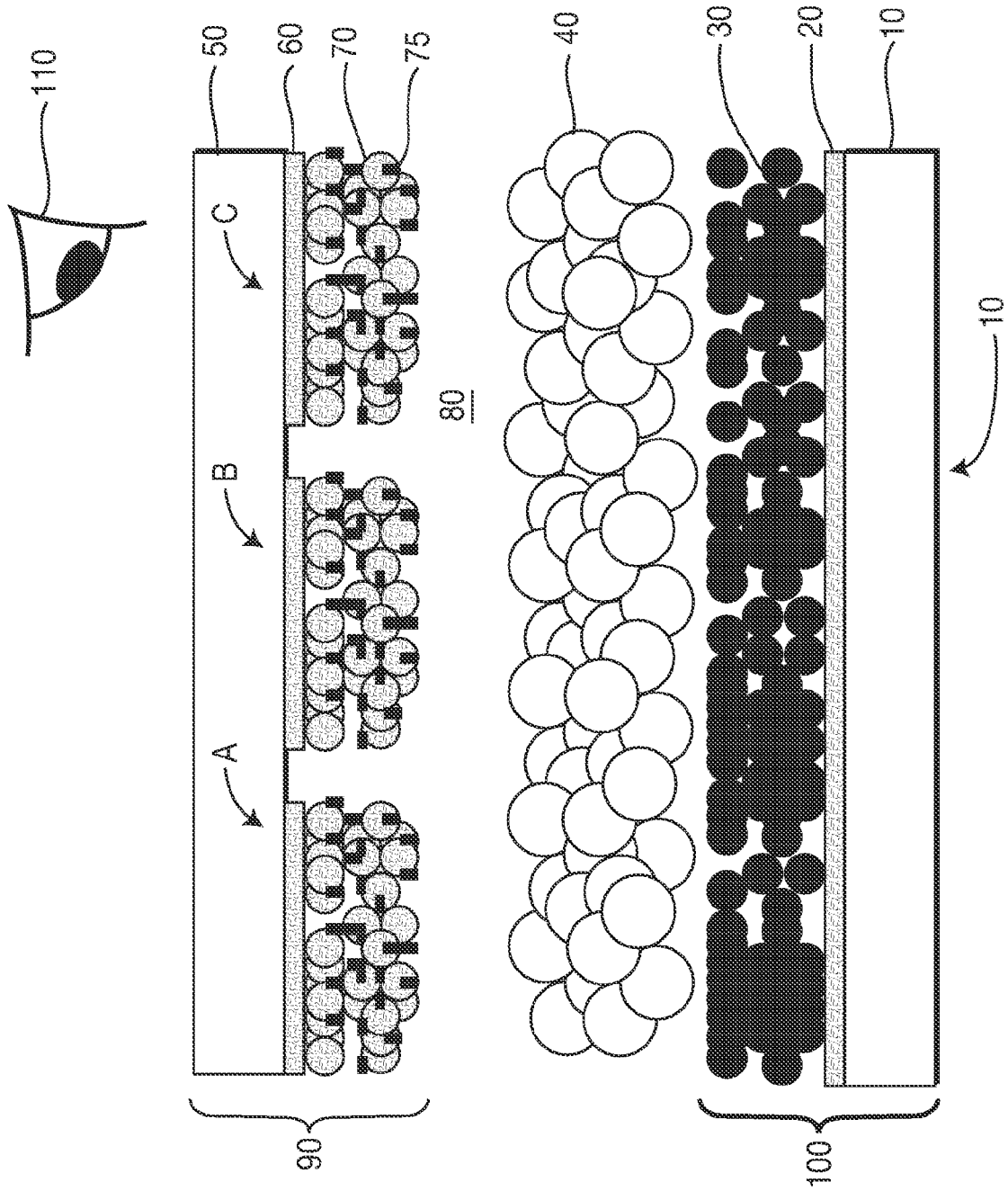
FIG. 1 is a direct-drive prior art electrochromic display device.
Figure 2A:
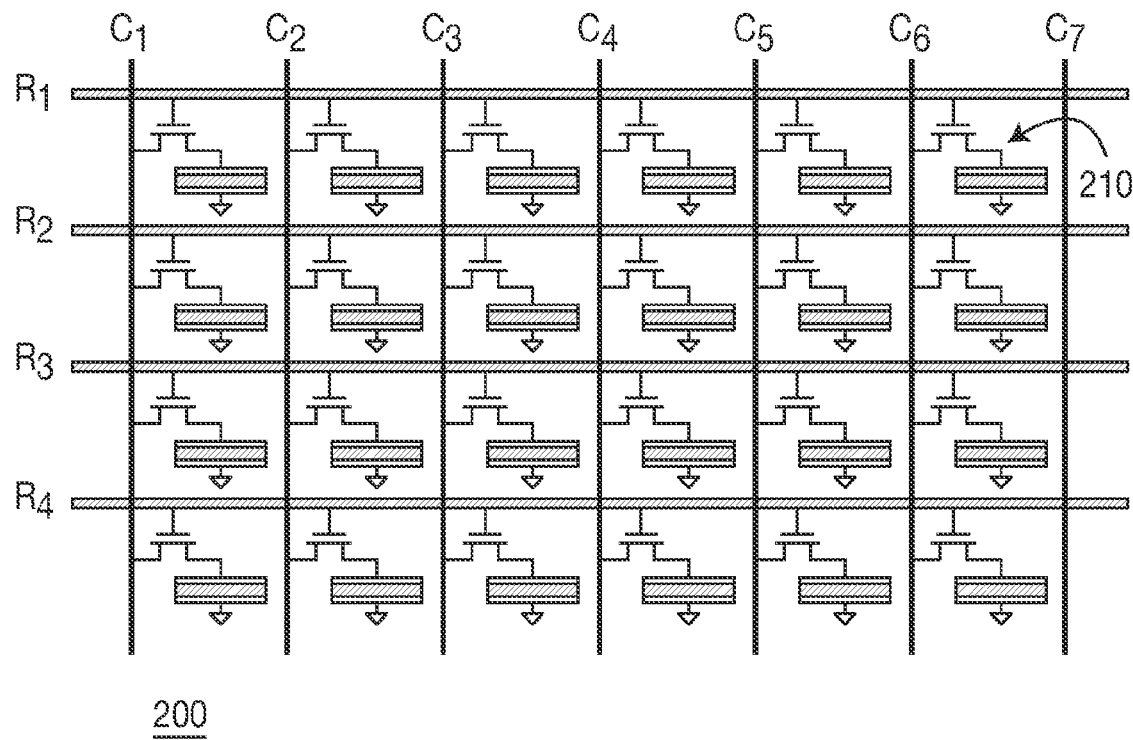
FIG. 2A is a schematic illustration of an active matrix for controlling a plurality of pixels in a display device.
Figure 2B:
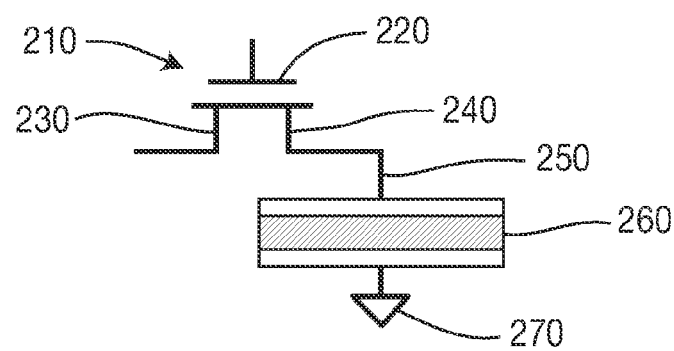
FIG. 2B is a schematic illustration of a single active element of the active matrix of FIG. 2A.
Figure 3:
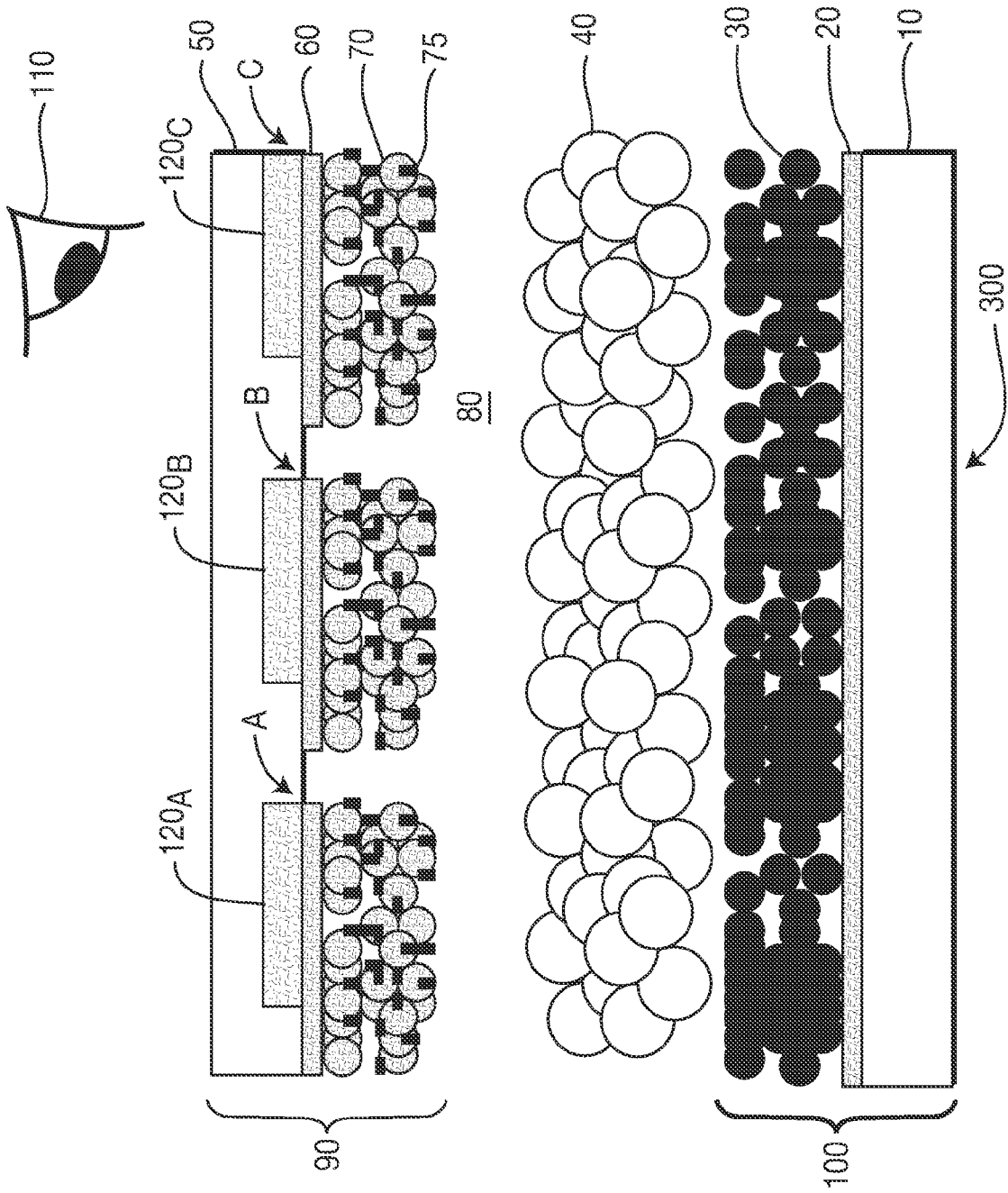
FIG. 3 is an illustration of the disadvantage of using an active component for individually addressing each pixel of a prior art electrochromic display device.
Figure 4:
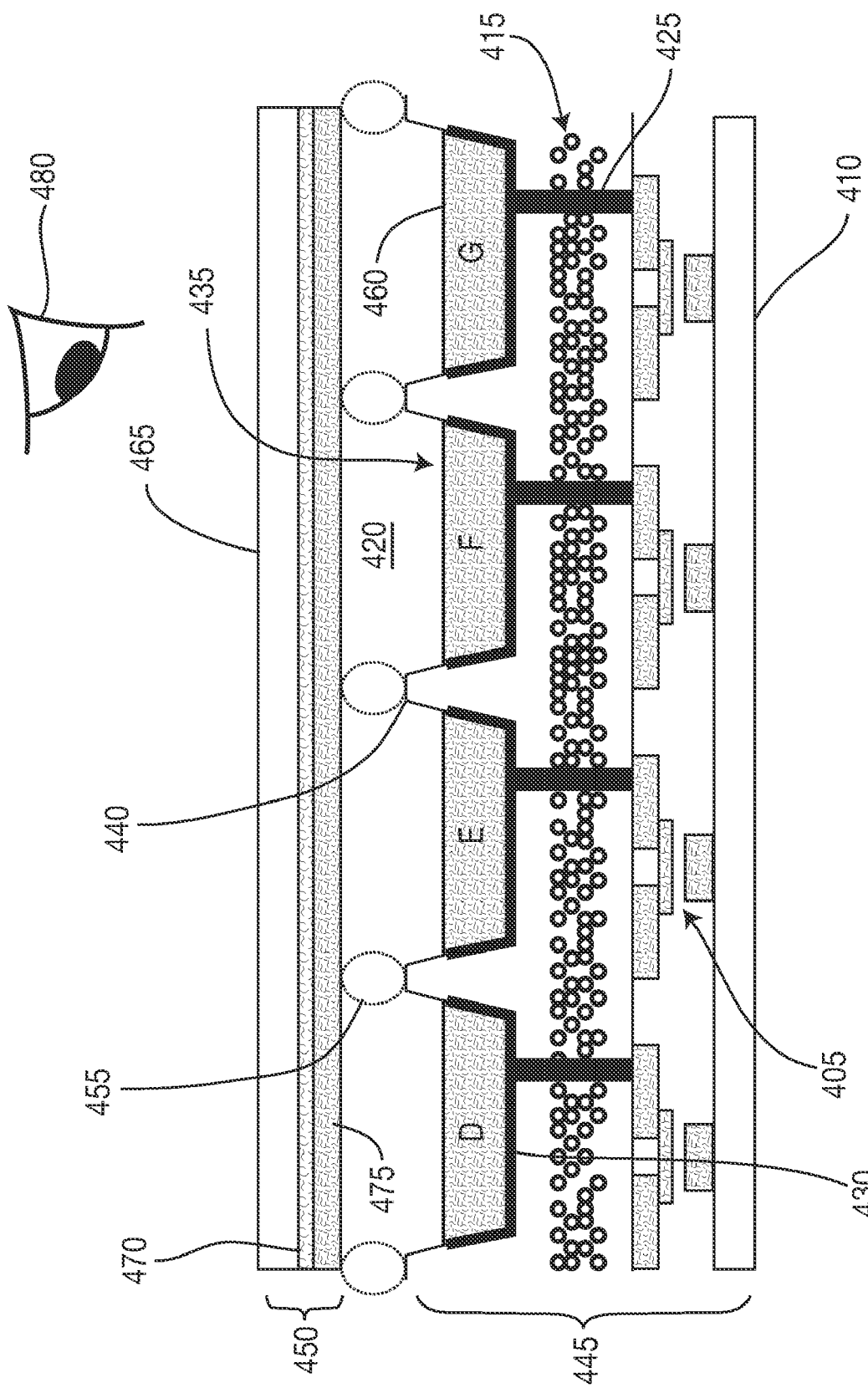
FIG. 4 is an active matrix electrochromic display device comprising a reflective insulating layer in accordance with a preferred embodiment of the present invention.

In a preferred embodiment, referring to FIG. 4, an active matrix electrochromic device 400 comprising a layer of active components 405 selectively deposited on a backplane substrate 410 is shown. It should be noted that the electrochromic display 400 contains 4 pixels D, E, F, and G, purely for illustrative purposes. Preferably, the active components 405 are n-channel metal-oxide-semiconductor field-effect (NMOS) TFTs. Alternatively, the active components may be p-channel metal-oxide-semiconductor field effect (PMOS) TFTs, complementary-symmetry metal-oxide-semiconductor field effect (CMOS) TFTs, thin film diodes (TFDs), micro-electromechanical structures (MEMS), or any other type of active device capable of being matrix addressed for switching an electrochromic pixel. The backplane substrate 410 is preferably glass, but may be any material capable of supporting the active components 405 and subsequent layers comprising the electrochromic display 400. For example, the backplane substrate 410 may comprise materials such as plastic, wood, leather, fabrics of various composition, metal, and the like. Accordingly, these materials may be rigid or flexible.

An insulating layer 415 is deposited on the active components 405. The insulating layer 415 is substantially impermeable to the electrolyte 420, thereby protecting the active components 405 from the possible corrosive effects of the electrolyte 420. Preferably, the insulating layer 415 is a spin-coated polymer, such as polyimide. The insulating layer 415 may be a single, monolithic layer, or it may comprise multiple layers of identical or different materials having desired properties to achieve a desired three dimensional structure. In a preferred embodiment, the insulating layer 415 is reflective. The reflective property of the insulating layer 415 may be inherent in the material that comprises the layer, or reflective particles may be interspersed in the insulating layer 415.

An operable connection 425, known in the art as a via, is provided in the insulating layer for electrically connecting the drain of the active component 405 to a conductor 430. Preferably, the operable connection 425 is created via photolithographic techniques, which are well known to those skilled in the art. Each operable connection, or via, 425 extends generally upwardly through the insulating layer 415 and is in electrical contact with a respective conductor 430, which preferably covers the bottom and the sides of a plurality of wells 435 formed or etched into the insulating layer 415. The operable connection 425 (i.e. via) and conductor 430 are preferably both transparent, and are preferably FTO or ITO.

The wells 435 are preferably etched in the insulating layer 415 using photolithographic techniques. Alternatively, the wells 435 are formed by mechanically embossing a deposited planar film or by application of a film containing a preformed waffle-type structure defining the wells 435.

Partitions 440 maintain electrical isolation of each well 435, and also allow the wells 435 to act as receptacles for ink-jet deposited materials. Partitions 440 may further act as a spacer between the cathode 445 and anode 450 of the electrochromic device 400, and serve to reduce ionic crosstalk between pixels through the electrolyte 420. The partitions 440 further serve the purpose of a visual boundary between each well 435, and may be sized as desired to achieve optimal appearance of each well 435. It should be noted that although the partitions are shown as greatly extended generally above the wells 435, they may alternatively be generally flush with the top of the wells 435.

A semiconducting layer 460 having an adsorbed electrochromophore is deposited on the conductor 430. Preferably, the semiconducting layer 460 is a nano-structured metallic oxide semiconducting film, as described hereinbefore. The semiconducting metallic oxide may be an oxide of any suitable metal, such as, for example, titanium, zirconium, hafnium, chromium, molybdenum, tungsten, vanadium, niobium, tantalum, silver, zinc, strontium, iron ($Fe^{2+}$ or $Fe^{3+}$) or nickel or a perovskite thereof. $TiO_2$, $WO_3$, $MoO_3$, ZnO, and $SnO_2$ are particularly preferred. Most preferably, the nano-structured film is titanium dioxide ($TiO_2$), and the adsorbed electrochromophore is a compound of the general formulas I-III:

conducting layer 460 is achieved by spatial separation, an additional isolating layer, or other isolating means. The corrosive effects of the electrolyte 420 on the active components 405 are still prevented by the insulating layer 415 in this alternative configuration. Optionally, selectively sized spacer beads 455 may be used to maintain a desired spacing between the cathode 445 and the anode 450.

A frontplane substrate 465, which is substantially transparent, supports a substantially transparent conductor 470. The substrate 465 may be any suitable transparent material, such as glass or plastic. The material may be rigid or flexible. FTO,

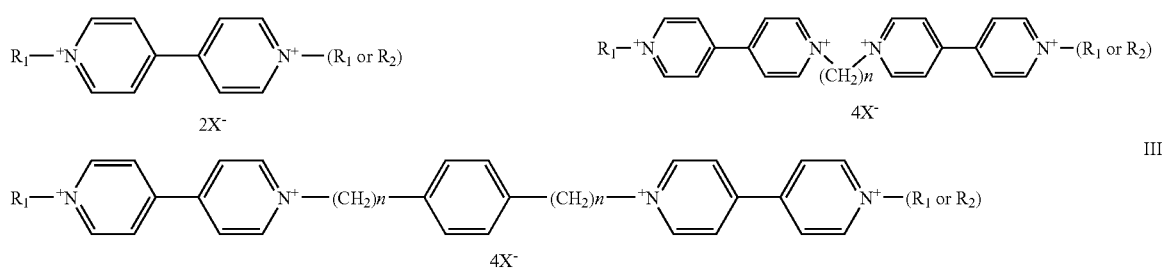

$R_1$ is selected from any of the following:

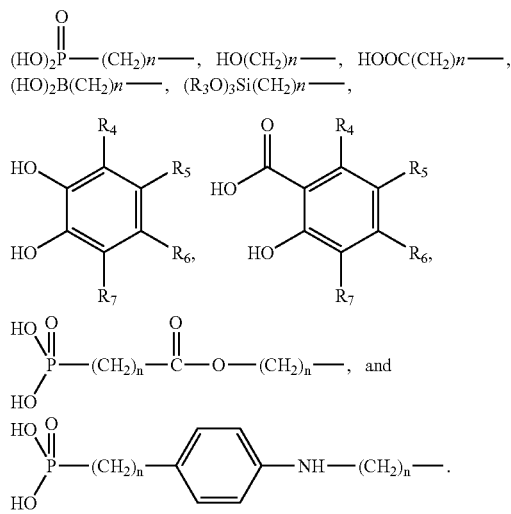

$R_2$ is selected from $C_{1-10}$ alkyl, N-oxide, dimethylamino, acetonitrile, benzyl, phenyl, benzyl mono- or di-substituted by nitro; phenyl mono- or di-substituted by nitro. $R_3$ is $C_{1-10}$ alkyl and $R_4$, $R_5$, $R_6$, and $R_7$ are each independently selected from hydrogen, $C_{1-10}$ alkyl, $C_1N_0$ alkylene, aryl or substituted aryl, halogen, nitro, and an alcohol group. X is a charge balancing ion, and n=1-10.

Compounds of the formulae I-III are well known and may be prepared as described in Solar Energy Materials and Solar Cells, 57, (1999), 107-125 which is hereby incorporated by reference in its entirety. In a preferred embodiment, the adsorbed electrochromophore is bis-(2-phosphonoethyl)-4, 4'-bipyridinium dichloride.

In an alternative embodiment, the reflective insulating layer 415 may be generally flat and electrical isolation of each pixel's D, E, F, and G transparent conductor 430 and semi- ITO, or any other suitable transparent conductor may be used for the transparent conductor 470.

A semiconducting layer 475 is deposited on the transparent conductor 470. Preferably, the semiconducting layer 475 is a nano-structured metallic oxide semiconducting film comprising Sb doped $SnO_2$. In an alternative embodiment, the semiconducting layer 475 includes an adsorbed redox promoter for assisting oxidation and reduction of electrochromic compounds adsorbed to the semiconducting layer 460 of the cathode 445.

The electrochromic display 400 is assembled by placing the anode electrode 450 onto the cathode electrode 445, ensuring that the two electrodes 445, 450 do not touch. Preferably, a flexible seal is formed around the perimeter, ensuring that the electrodes 445, 450 do not touch. Alternatively, physical separation of the cathode electrode 445 and the anode electrode 450 may be ensured by first depositing spacer beads 455 or other spacer structures as mentioned herein. The partitions 440 formed on the insulating layer 415 may also act to maintain a separation between the cathode electrode 445 and anode electrode 450. It should be noted that the anode electrode 450 covers the entire area of the pixels D, E, F, and G and is not segmented into individual areas corresponding to the area of the pixels D, E, F, and G. An electrolyte 420 is provided between the electrodes 445, 450, preferably by back-filling in a vacuum chamber.

An electric potential applied across the cathode electrode 445 and the anode electrode 450 induces the flow of electrons in the semiconducting layer 460 having adsorbed electrochromophores. Upon oxidation and reduction, the adsorbed electrochromophores change color. Preferably, the adsorbed electrochromophores are substantially black in a reduced state and generally transparent in an oxidized state. A viewer 480 perceives a pixel containing a reduced adsorbed electrochromophore as a generally black pixel. Viewer 480 perceives a pixel containing an oxidized adsorbed electrochromophore (i.e. a transparent adsorbed electrochromophore) as the color of the underlying reflective insulating layer 415. In this manner, an active matrix electrochromic display is realized.

Alternatively, each well 435 may contain a semiconducting layer 460 having adsorbed electrochromophores that exhibit different color properties. For example, adsorbed electrochormophores that appear red, green, and blue in a reduced state and transparent in an oxidized state may be used. In this alternative embodiment, reflective insulating layer 415 is preferably white. By selectively applying a potential to each pixel, the appearance of each pixel D, E, F, and G may be switched between the colored state of the electrochromophore and the color of the underlying reflective insulating layer 415.

Figure 5:
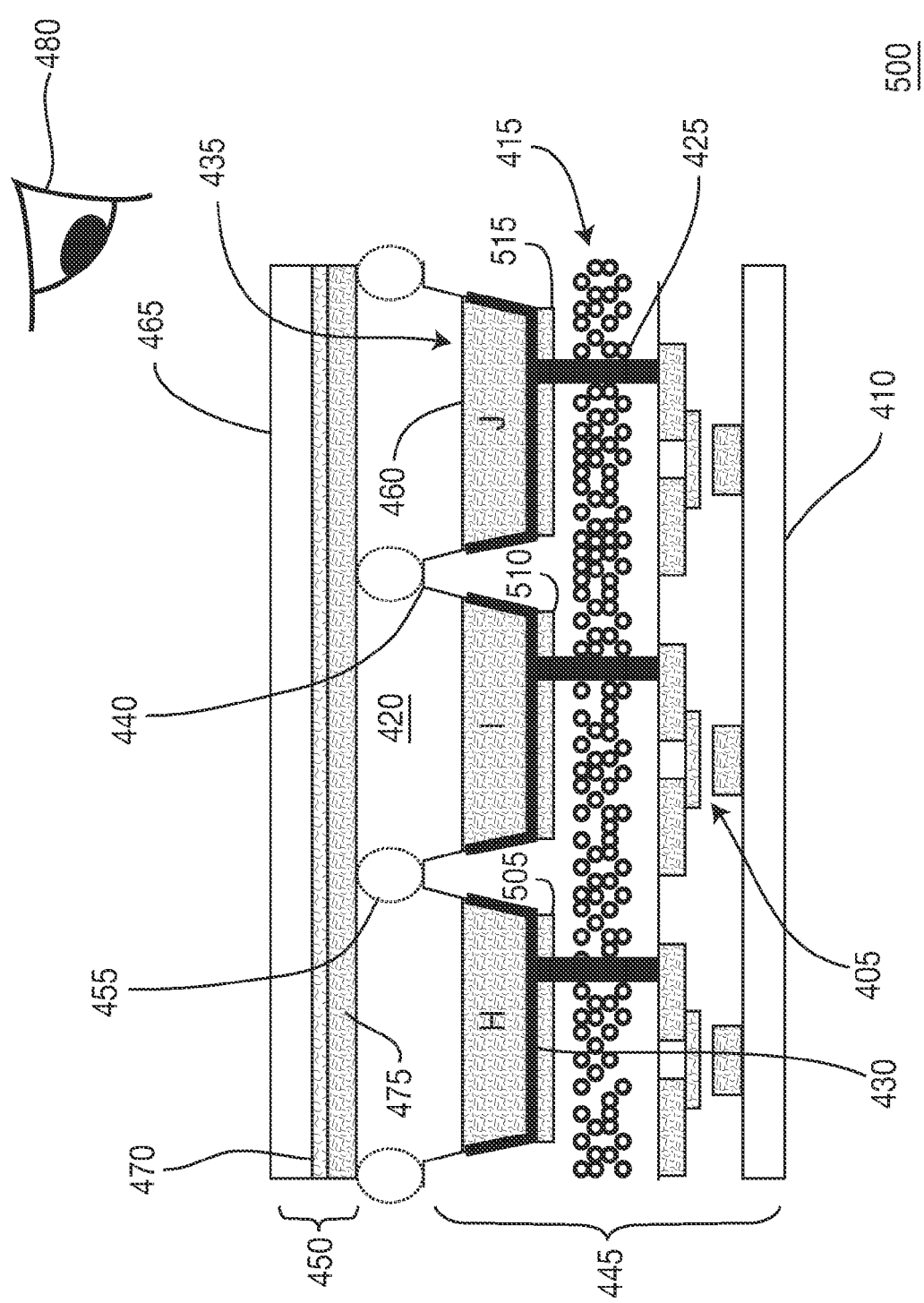
FIG. 5 is an active matrix electrochromic display device comprising a reflective layer in accordance with an alternative embodiment of the present invention.

In an alternative embodiment, referring to FIG. 5, an electrochromic display 500 further includes one or more reflective layer 505, 510, and 515 associated with each pixel H, I, and J, respectively. The reflective layers 505, 510, and 515 are positioned between the insulating layer 415 and the transparent conductor 430 of each respective pixel H, I, and J. In a preferred embodiment, the reflective layers 505, 510, and 515 are generally red, green, and blue, respectively. The reflective layers 505, 510, and 515 are preferably positioned in each well 435, and are preferably colored inks deposited by way of an ink-jet printing process. It should be noted that in color displays pixels H, I, and J are generally referred to as sub-pixels, and the three sub-pixel display 500, as a whole, is generally referred to as a pixel. It should also be noted that in this embodiment, the insulating layer 415 need not be reflective. However, the insulating layer 415 may possess reflective properties for improved color and brightness.

Alternatively, reflective layers 505, 510, and 515 may be transmissive, color filtering layers. The reflectivity of these layers 505, 510, 515 may be selected as desired. In this alternative embodiment, the insulating layer 415 is necessarily reflective. Preferably, colors are selected, such as red, green, and blue, so that a full color display is achieved.

When the adsorbed electrochromophore of pixel J is oxidized and therefore transparent, light passes through the nano-structured film 460 of pixel J and reflects off of the reflective layer 515. Accordingly, when the adsorbed electrochromophore of pixel J is oxidized, viewer 480 perceives pixel J as the color of the underlying reflective layer 515, which in this exemplary embodiment is blue.

It should be noted that the amount of reduction and/or oxidation of the adsorbed electrochromophore may be selectively controlled. By selectively controlling the amount of reduction and oxidation, and thus the transparency of the nano-structured film with adsorbed electrochromophore, varying degrees of coloration can be achieved for each pixel, thereby allowing control of the perceived brightness of the pixel. Combining the tri-colored pixel architecture of display 500 with selective coloration of each sub-pixel H, I, and J, a wide range of additive colors may be realized by a viewer 480.

Figure 6:
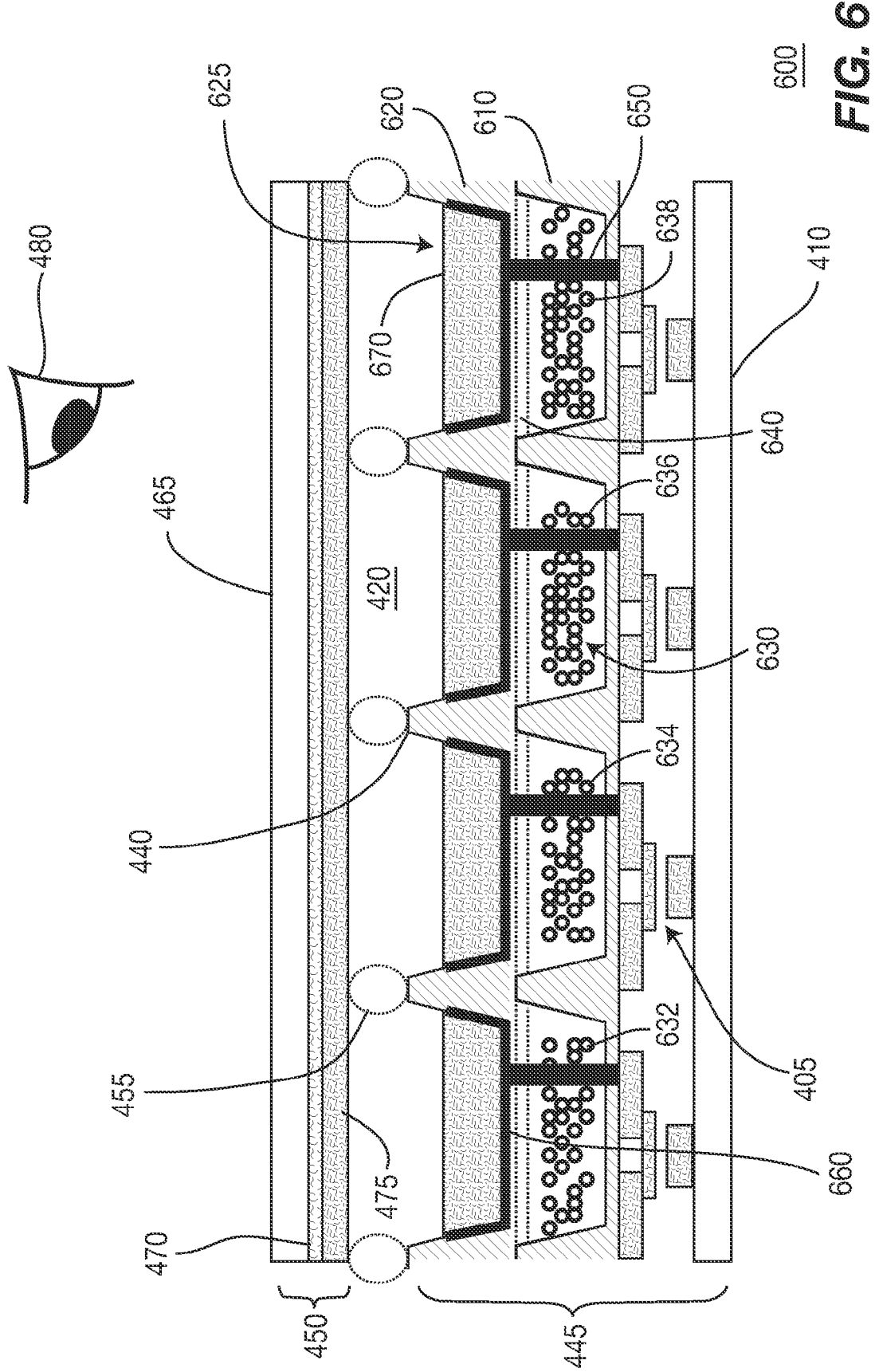
FIG. 6 is an active matrix electrochromic display device comprising a reflective layer positioned between two insulating layers in accordance with an alternative embodiment of the present invention.

In another embodiment, referring to FIG. 6, an active matrix electrochromic display 600 includes multiple insulating layers 610, 620. A base insulating layer 610 is deposited on the active components 405. The base insulating layer 610 may be polyimide and may be deposited as discussed above with reference to reflective layer 415. A plurality of wells 630 are etched or otherwise formed in the base insulating layer 610, as described hereinbefore. Differentially colored reflective layers 632, 634, 636, and 638 are deposited into the plurality of wells 630. Preferably, the differentially colored reflective layers 632, 634, 636, and 638 are red, green, and blue, but may be any color as desired. The differentially colored reflective layers 632, 634, 636, and 638 are preferably reflective materials or reflective materials having reflective colored particles dispersed throughout as described above with reference to reflective layer 415, and are preferably deposited into the plurality of wells 630 by way of ink-jet printing methods.

Optionally, an intermediate insulating layer 640 is deposited onto the base insulating layer 610 after the differentially colored reflective layers 632, 634, 636, and 638 have been deposited. The intermediate insulating layer 640 is again preferably polyimide. The intermediate insulating layer 640 serves to protect the differentially colored reflective layers 632, 634, 636, and 638, and provides a smooth surface for the deposition of the top insulting layer 620. The top insulating layer 620 is deposited on the base insulating layer 610, or on the optional intermediate insulating layer 640. The top insulating layer is preferably polyimide, and is preferably deposited by spin coating, as described hereinbefore. It is noted that the base insulating layer 610, the optional intermediate insulating layer 640, and the top insulating layer 620 may be any material that is electrically insulating and resistant to the potential corrosive effects of the electrolyte 420.

As described hereinbefore with reference to FIG. 4, a plurality of wells 625 is etched in the top insulating layer 610. An operable connection 650 (i.e. a via) is created through to the active components 405, preferably using photolithographic techniques. Each operable connection 650 extends generally upwardly through the base insulating layer 610, the respective differentially colored reflective layers 632, 634, 636, and 638, the optional intermediate insulating layer 640, and the top insulating layer 620. Each operable connection 650 is in electrical contact with a respective transparent conductor 660, which preferably cover the bottom and the sides of each respective well 625 formed or etched into the top insulating layer 620. The conductor 660 is preferably FTO or ITO. A semiconducting layer 670 having an adsorbed viologen is deposited into each well 625, as described hereinbefore.

The active matrix electrochromic display device 600 is assembled as described hereinbefore. It should be noted that while FIG. 6 shows four pixels, this is merely exemplary and is not meant to limit the scope of the present invention.

Figure 7:
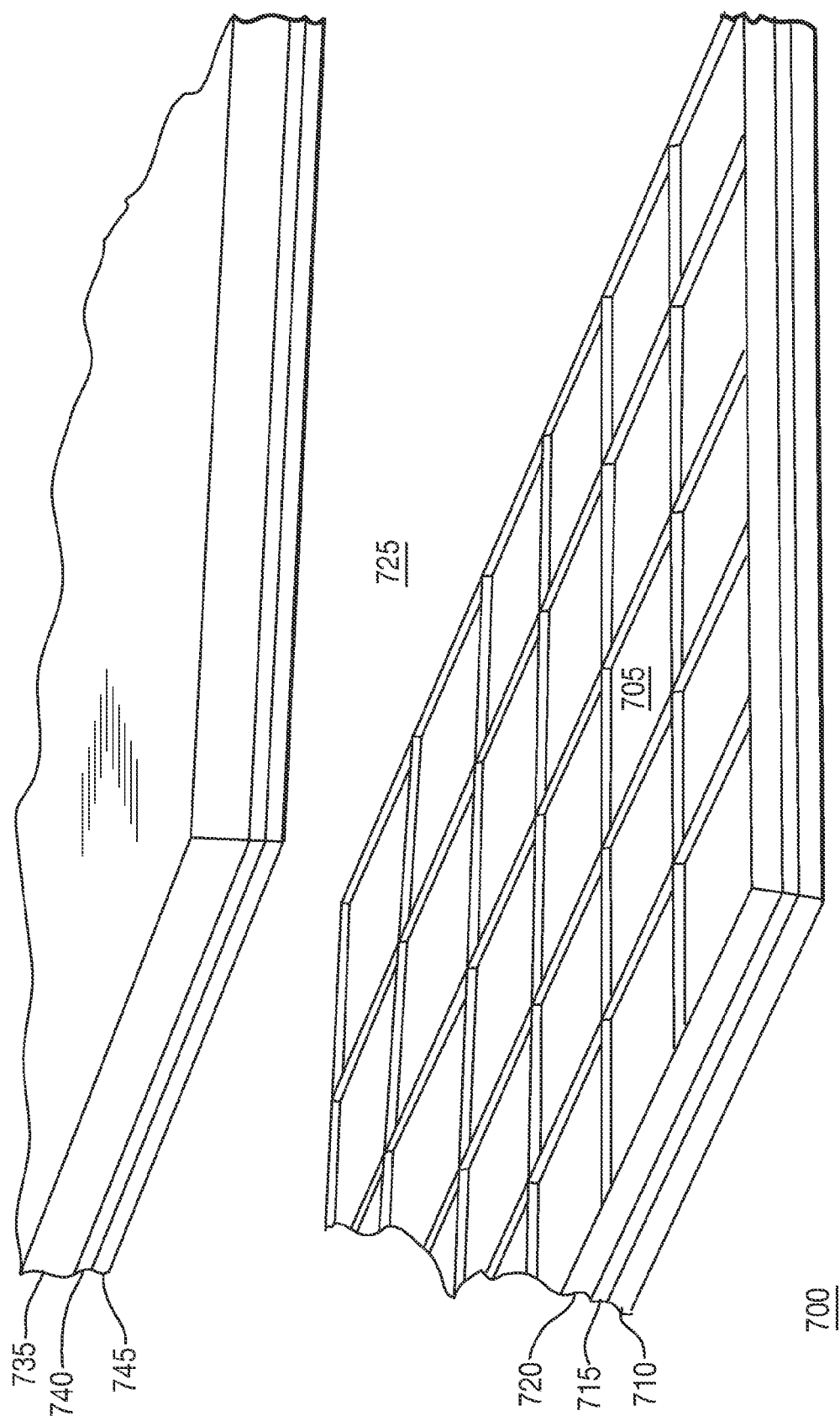
FIG. 7 is a perspective view of an electrochromic device containing a plurality of individually addressable pixels.

Referring now to FIG. 7, an active matrix electrochromic display device 700 comprises a plurality of electrochromic pixels 705 supported by a backplane substrate 710. It should be noted that while the pixels 705 are depicted as being generally square purely for illustrative purposes, the pixels 705 may be any shape to achieve a desired image appearance. It should also be noted that the pixels 705 are constructed in accordance with the architecture described above with reference to FIGS. 4, 5, and 6. A layer of active components 710 allow for matrix addressing of the pixels 705. Insulating layer 720 electrically isolates the layer of active components 715 from an electrolyte 725. It should be noted that the pixel 705 architecture permits each pixel's respective active component to have an area substantially equal to the viewable area of the pixel without interfering with the reflectivity of the pixel, as the active component is placed underneath the reflective layer, with respect to a viewer. Each pixel contains a semiconducting layer 730 having an adsorbed electrochromophore. A frontplane substrate 735, which is substantially transparent, supports a substantially transparent conductor 740, and a substantially transparent semiconducting layer 745.

To actively control the multitude of pixels 705, a plurality of rows $r_1, r_2, \ldots, r_n$ and columns $c_1, c_2, \ldots, c_m$ of conducting material are formed in the active component layer 715. Preferably, as discussed above with general reference to active matrix addressing, the row conductor is the gate of the active component and the column conductor is the source. In a preferred embodiment, a potential $V_{data}$ is applied to the column containing the pixel which is to be energized. $V_{data}$ is selected such that the desired level of coloration of the pixel will be achieved when the potential $V_{data}$ is applied across the pixel. A potential is applied on the corresponding row of the pixel to be energized, thereby switching the active component of the pixel. The potential $V_{data}$ is preferably maintained on the column for a longer duration than the switching potential is maintained on the row $r_1$. More preferably, the potential $V_{data}$ is maintained for at least a time $\tau$, wherein:

$$\tau = 5RC, \qquad \text{Equation (1)}$$

where C is the equivalent capacitance of the cell and any parasitic elements, such as the column $c_1$ capacitance and the active component capacitance, and R is the charging resistance of the circuit including the active component resistance and any parasitic elements such as the column $c_1$ resistance and the internal resistance of the electrochromic pixel.

In another embodiment, a current $I_{data}$ is applied to either the gate or the source of the active device (i.e. either the row or the column) once a pixel is isolated. $I_{data}$ is maintained on the column for a period T as follows:

$$T = Q_{Coloration}/I_{data}, \qquad \text{Equation (2)}$$

where $Q_{Coloration}$ is the charge required to produce a desired coloration of the isolated pixel. In this embodiment, $I_{data}$ may be fixed across all rows, in which case T is varied to achieve the desired coloration of pixels. Alternatively, T may be fixed, in which case $I_{data}$ is modulated for each pixel in order to achieve a desired coloration.

In another embodiment, a constant potential $V_{drive}$ is applied to the source (i.e. column) of a pixel. A potential is applied to the corresponding gate row for the pixel in order to switch the pixel's active component. The absolute value of the potential $V_{drive}$ is greater than the cathode potential required to produce a desired coloration of the pixel, $V_{data}$, (i.e. $|V_{drive}| > V_{data}$). The period of $V_{drive}$ is then modulated to produce the desired coloration of the pixel. The period of $V_{drive}$ may be of a fixed duration, where a number of pulses are applied sequentially to the pixel to produce the desired coloration. Alternatively, the pulses of $V_{drive}$ may be weighted in order to achieve a desired coloration, and to account for gamma correction of the electrochromic display.

Although the features and elements of the present invention are described in the preferred embodiments in particular combinations, each feature or element can be used alone without the other features and elements of the preferred embodiments or in various combinations with or without other features and elements of the present invention.

What is claimed is:

1. An active matrix electrochromic display device comprising:
    a first electrode comprising:
        a first substrate;
        an active component associated with the first substrate, the active component configured for controlling the electric potential within the electrochromic display device;
        a reflective insulating layer associated with the active component;
        a first conductor associated with the insulating layer, wherein the first conductor is electrically coupled to the active component by way of an operable connection in the insulating layer; and
        a semiconducting layer associated with the first conductor, the semiconducting layer having an electrochromophore adsorbed thereto;
    a second electrode comprising:
        a second substrate being substantially transparent;
        a second conductor associated with the second substrate, the second conductor being substantially transparent; and
        a substantially transparent semiconducting layer associated with the second conductor; and
    an electrolyte between the first and second electrode.

2. The electrochromic display device of claim 1, wherein the semiconducting layer associated with the first conductor is a nano-structured metallic oxide semiconducting film.

3. The electrochromic display device of claim 1, wherein the substantially transparent semiconducting layer is a nano-structured metallic oxide semiconducting film.

4. The electrochromic display device of claim 1, wherein the active component is a transistor.

5. The electrochromic display device of claim 4, wherein the transistor is a thin film transistor (TFT).

6. The electrochromic display device of claim 4, wherein the transistor covers substantially the same area as the semiconducting layer having an electrochromophore adsorbed thereto.

7. The electrochromic display device of claim 1, wherein the active component is a thin film diode (TFD).

8. The electrochromic display device of claim 1, wherein the first substrate is selected from the group consisting of: glass, plastic, wood, leather, fabric, and metal.

9. The electrochromic display device of claim 1, wherein the second substrate is selected from the group consisting of: glass and plastic.

10. The electrochromic display device of claim 1, wherein the second conductor is selected from the group consisting of: fluorine doped tin oxide and indium doped tin oxide.

11. The electrochromic display device of claim 1, wherein the reflective insulating layer comprises polyimide.

12. The electrochromic display device of claim 11, wherein the reflective insulating layer further comprises a plurality of reflective particles distributed throughout the reflective insulating layer.

13. The electrochromic display device of claim 11, wherein a density of coloration of the semiconducting layer having an electrochromophore adsorbed thereto is selectively and continuously adjustable between a fully transparent state and a fully colored state.

14. The electrochromic display device of claim 1, wherein the semiconducting layer having an electrochromophore adsorbed thereto appears generally black under a first applied electric potential, and appears generally transparent under a second applied electric potential.

15. The electrochromic display device of claim 1, wherein the semiconducting layer having an electrochromophore adsorbed thereto appears generally colored under a first applied electric potential, and appears generally transparent under a second applied electric potential.

16. The electrochromic display device of claim 15, wherein a color of a semiconducting layer having an electrochromophore adsorbed thereto under a first applied electric potential is selected from the list comprising: red, green, and blue.

17. The electrochromic display device of claim 15, wherein the coloration of the semiconducting layer having an electrochromophore adsorbed thereto is selectively adjustable.

18. The electrochromic display device of claim 1, wherein the insulating layer comprises a well, and the semiconducting layer having an electrochromophore adsorbed thereto is associated with the well.

19. The electrochromic display device of claim 1, wherein the reflective insulating layer is selectively colored.

20. The electrochromic display device of claim 1, wherein the adsorbed electrochromophore is selectively colored.

21. An active matrix electrochromic display device having a plurality of pixels, the device comprising:
- a first electrode comprising:
  - a first substrate;
  - a plurality of active components associated with the first substrate, one for each pixel, the active components configured for controlling the electric potential within each pixel;
  - a reflective insulating layer associated with the plurality of active components and substantially covering the plurality of active components, the reflective insulating layer comprising:
    - a plurality of wells, each well comprising:
      - an operable connection to a respective active component;
      - a substantially transparent conductor associated with each well and electrically coupled to a respective active component by way of an operable connection;
      - a semiconducting layer having an electrochromophore adsorbed thereto;
- a second electrode comprising:
  - a second substrate being substantially transparent;
  - a second conductor associated with the second substrate, the second conductor being substantially transparent; and
  - a substantially transparent semiconducting layer associated with the second conductor; and
- an electrolyte between the first and second electrodes.

22. The electrochromic display device of claim 21, wherein the semiconducting layer associated with the first conductor is a nano-structured metallic oxide semiconducting film.

23. The electrochromic display device of claim 21, wherein the substantially transparent semiconducting layer is a nano-structured metallic oxide semiconducting film.

24. The electrochromic display device of claim 21, wherein the active components are transistors.

25. The electrochromic display device of claim 24, wherein the transistors are thin film transistors (TFTs).

26. The electrochromic display device of claim 24, wherein each transistor covers substantially the same area as a respective semiconducting layer having an electrochromophore adsorbed thereto.

27. The electrochromic display device of claim 21, wherein the active components are thin film diodes (TFDs).

28. The electrochromic display device of claim 21, wherein the first substrate is selected from the group consisting of: glass, plastic, wood, leather, fabric, and metal.

29. The electrochromic display device of claim 21, wherein the second substrate is selected from the group consisting of: glass and plastic.

30. The electrochromic display device of claim 21, wherein the second conductor is selected from the group consisting of: fluorine doped tin oxide and indium doped tin oxide.

31. The electrochromic display device of claim 21, wherein the reflective insulating layer comprises polyimide.

32. The electrochromic display device of claim 31, wherein the reflective insulating layer further comprises a plurality of reflective particles distributed throughout the reflective insulating layer.

33. The electrochromic display device of claim 31, wherein each semiconducting layer having an electrochromophore adsorbed thereto appears generally black under a first applied electric potential, and appears generally transparent under a second applied electric potential.

34. The electrochromic display device of claim 31, wherein a density of coloration of each semiconducting layer having an electrochromophore adsorbed thereto is selectively and continuously adjustable between a fully transparent state and a fully colored state.

35. The electrochromic display device of claim 31, wherein each semiconducting layer having an electrochromophore adsorbed thereto appears generally colored under a first applied electric potential, and appears generally transparent under a second applied electric potential.

36. The electrochromic display device of claim 35, wherein a color of a semiconducting layer having an electrochromophore adsorbed thereto under a first applied electric potential is selected from the list comprising: red, green, and blue.

37. The electrochromic display device of claim 35, wherein the coloration of each semiconducting layer having an electrochromophore adsorbed thereto is selectively adjustable.

38. The electrochromic display device of claim 21, wherein the reflective insulating layer is selectively colored.

39. An active matrix electrochromic display, the display comprising:
- a backplane associated with a matrix of active components, a reflective layer associated with the matrix of active components, and a plurality of segments of nano-structured film having an electrochromophore adsorbed thereto, each segment associated with an active component;
- a substantially transparent frontplane associated with a nano-structured semiconducting film; and
- an electrolyte between the plurality of segments of nano-structured film having an electrochromophore adsorbed thereto associated with the backplane and the nano-structured semiconducting film associated with the frontplane;
- wherein application of an electric potential to a segment of nano-structured film having an electrochromophore adsorbed thereto via an associated active component causes a color change in the electrochromophore visible to the viewer through the substantially transparent frontplane.

* * * * *